United States Patent [19]

Atkins et al.

[11] Patent Number: 4,817,840
[45] Date of Patent: Apr. 4, 1989

[54] APPARATUS FOR FEEDING LEADER TAPE

[75] Inventors: Bruce Atkins, Montreal; Pierre Tardif, Longueuil, both of Canada

[73] Assignee: Leader Brac Industries Inc., Canada

[21] Appl. No.: 125,329

[22] Filed: Nov. 25, 1987

[30] Foreign Application Priority Data

Mar. 2, 1987 [CA] Canada ................................. 530932

[51] Int. Cl.[4] .............................................. B26D 9/00
[52] U.S. Cl. ......................................... 225/7; 83/260; 83/650; 225/16; 225/23; 225/38; 225/47; 225/88
[58] Field of Search .............................. 225/7, 14–16, 225/37, 38, 47, 88, 23, 24; 83/260, 649, 650

[56] References Cited

U.S. PATENT DOCUMENTS

| 632,047 | 8/1899 | Freese | 83/260 X |
|---|---|---|---|
| 1,448,270 | 3/1923 | Grasberger | 225/15 |
| 1,626,257 | 4/1927 | Swanson et al. | 225/38 X |
| 2,788,852 | 4/1957 | Sharpe | 225/47 X |
| 2,792,184 | 5/1957 | Kresser | 225/47 |
| 3,702,672 | 11/1972 | Becht | 225/47 X |
| 3,971,280 | 7/1976 | Inka | 225/15 X |
| 4,379,019 | 4/1983 | Pool | 225/38 X |
| 4,640,167 | 2/1987 | Stusack et al. | 225/15 X |
| 4,645,107 | 2/1987 | Norris | 225/37 |

Primary Examiner—Frank T. Yost
Assistant Examiner—Rinaldi Rada
Attorney, Agent, or Firm—Larson and Taylor

[57] ABSTRACT

A leader tape housing is provided with a compartment for mounting a reel with a leader tape thereon. A guide is provided for changing the path of the tape and the plane of the tape. A feeder device is provided in the housing which includes a first roller and a second roller forming a nip therebetween, the second roller being provided with a manually operable handle for driving it. The second roller includes a pair of diametrically opposed arc segments and a pair of diametrically opposed flats, such that the arc segments, when opposite the first wheel, form a nip with the wheels in contact therewith, and when the flats are opposite the first wheel, a gap is formed at the nip, allowing the tape to be pulled through without restraint. A cutting device is mounted on the cutting path on the outside of the housing for moving a knife against a die across the path of the tape, and means are provided for adjusting the angular plane of the knife. An adhesive tape dispenser is also mounted on the housing. The adhesive tape dispenser includes a dispensing wheel having circumferential ribs over which the adhesive surface of the tape passes, and a driving wheel over the dispensing wheel forming a nip therewith and engaging the top surface of the adhesive tape for feeding the adhesive tape through a slot in the housing.

5 Claims, 3 Drawing Sheets

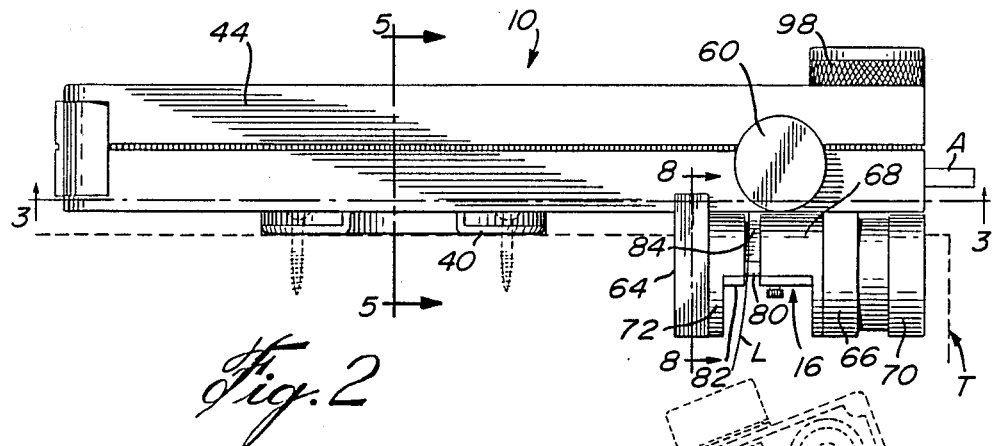
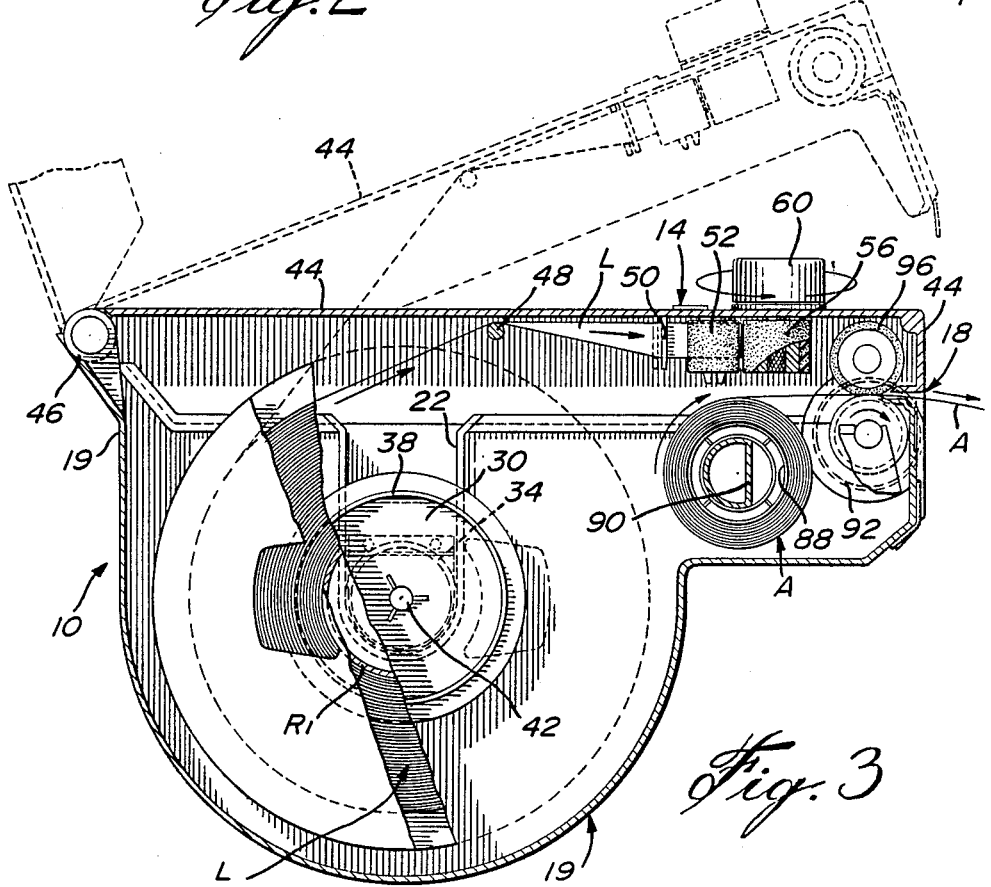

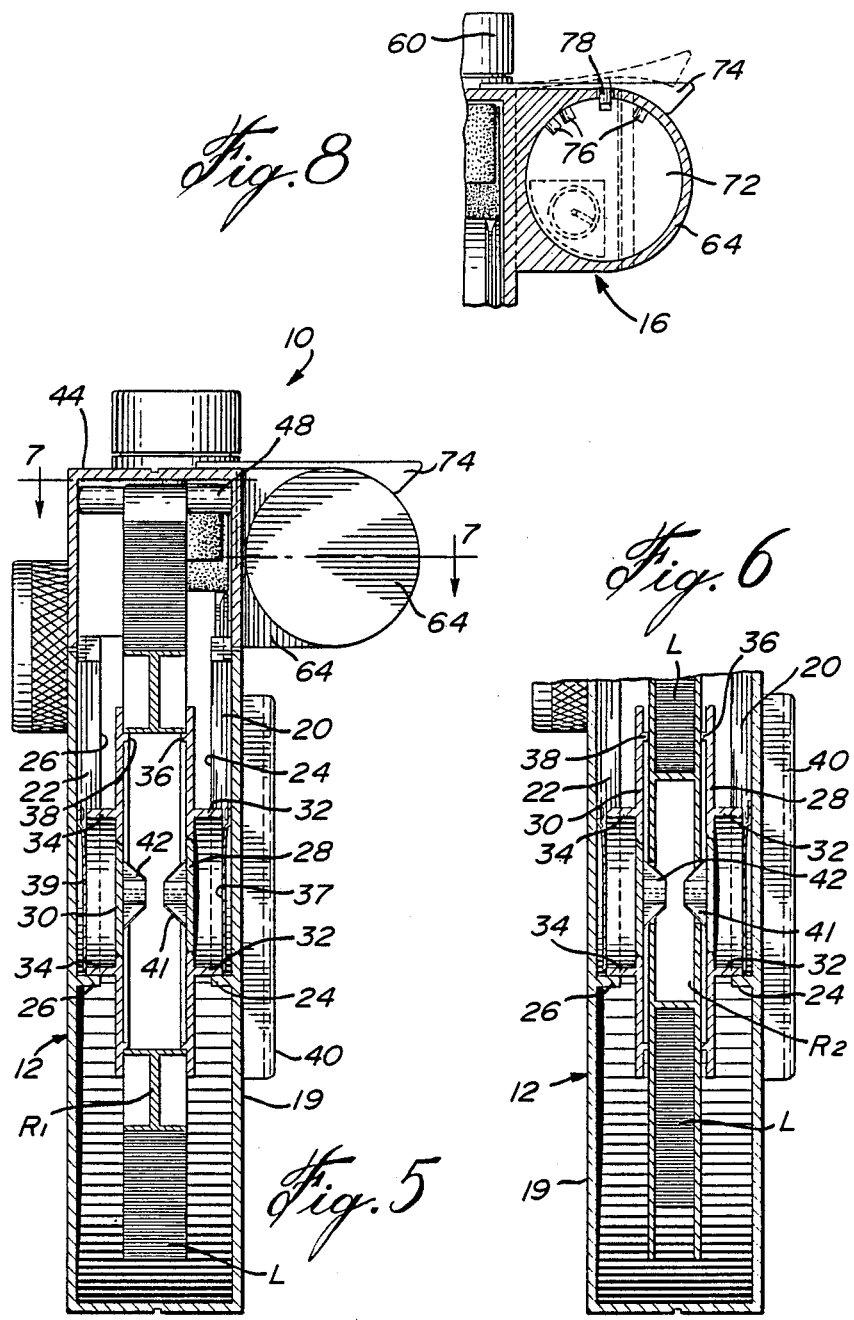

APPARATUS FOR FEEDING LEADER TAPE

FIELD OF THE INVENTION

The present invention relates to an accessory for a tape recording machine, and more particularly, to a leader tape holder and feeder.

BACKGROUND OF THE INVENTION

Leader or splicing tape is utilized in the field of editing audio, video tape, or film. The leader tape is used as a lead segment connected to a tape in order to lead the tape through the various paths required in a reproduction unit, or to be used as a spacer in a length of tape.

Presently, leader tape is supplied in reels, and a reel of leader tape is merely mounted loosely to the side of a recording machine without any provision for preventing the leader tape from unravelling when in use or not. Adhesive tape must also be kept on hand for the purposes of splicing the leader tape to the audio or other tape.

The leader tape, when taken from an open reel, must change direction and plane from a path tangent to the reel towards the editing area where it is to be spliced. This changing of direction can cause the leader tape to fold, thereby damaging it.

In the present specification, the term "tape" means film, audio tape, video tape, as well as other types of tapes with which a leader tape might be considered useful. The term "leader tape" also includes splicing or blank tape useful in a splicing operation.

OBJECTS AND STATEMENT OF THE PRESENT INVENTION

It is an aim of the present invention to provide a compact leader tape reel housing which can be mounted to a recording machine and is useful for storing, feeding, and cutting the leader tape.

It is also an aim of the present invention to provide a means for changing the path of the leader tape in a manner such that it will be prevented from folding or otherwise being damaged.

It is also an aim of the present invention to provide a leader tape housing which is provided with features such as an adhesive tape dispenser integral therewith.

A construction in accordance with the present invention comprises a housing including means for rotatably mounting a reel of tape, and guide means in the housing for determining the feed path of the tape to change directions and planes of the path of the tape. Means are mounted on the housing for selectively engaging the tape and advancing it in the feed path. Cutting means are also mounted on the housing for cutting the tape in the feed path downstream of the means for advancing the tape.

In a more specific embodiment of the present invention, the housing is provided with means for accommodating different reel sizes.

In a further embodiment of the present invention, an adhesive dispenser is mounted integrally to the housing.

BRIEF DESCRIPTION OF THE DRAWINGS

FIG. 2 is a top plan view of an embodiment in accordance with the present invention;

FIG. 3 is a longitudinal vertical cross-section, taken along line 3—3 of FIG. 2;

FIG. 5 is a vertical cross-section, taken along line 5—5 of FIG. 2;

FIG. 6 is a fragmentary cross-section, similar to FIG. 5, the same arrangement with a different size reel;

FIG. 8 is a vertical cross-section, taken along line 8—8 of FIG. 2.

DESCRIPTION OF A PREFERRED EMBODIMENT

Figure 7:
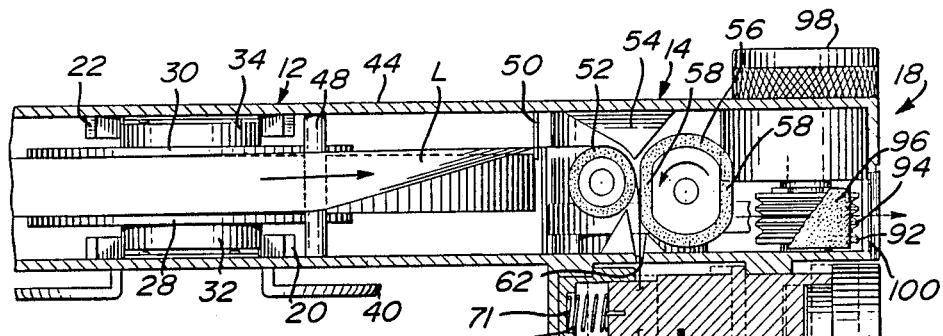
FIG. 7, which is on the same sheet of drawings as FIG. 1, is a horizontal cross-section, taken along line 7—7 of FIG. 5.

Referring now to the drawings, there is shown a leader tape housing 10 provided with a compartment 12 for mounting a reel R, a leader tape feeder 14, and cutter assembly 16. An adhesive tape dispenser 18 is also provided on the leader tape housing 10.

The reel compartment 12 includes housing walls 19, in which are formed channels 20 and 22 open towards the top. The channels 20 and 22, as shown in FIG. 7, are formed on opposite sides of the housing walls 19 and are formed by means of ribs 24 and 26 respectively. The channels are open to the top and are adapted to receive reel adaptor hubs 28 and 30 respectively.

Each reel adaptor hub 28 and 30 includes a projecting annular hub rib 32 and 34 respectively and inner projecting annular ribs 36 and 38 respectively. The circular hub ribs 32 and 34 on the adaptor hubs 28 and 30 are adapted to fit in the channels 20 and 22 respectively.

Each of the adaptor hubs 28 and 30 are separate, unconnected members which fit in the opening of a reel $R_1$, as shown in FIG. 5. As shown, it is the annular ribs 36 and 38 which are seated within the openings of the reel $R_1$. The annular ribs 32 and 34 allow the reel $R_1$ mounted between hubs 28 and 30 to be freely rotated. Leaf springs 37 and 39 may also be provided to act against the adaptor hubs 28 and 30 in order to provide some resistance to rotation of the reel so as to prevent the reel from being freely unravelled when the tape is pulled.

As shown in FIG. 6, a smaller size tape reel $R_2$ can be used in the housing 10, utilizing the same hub adaptors 28 and 30. In this case, sprocket projections 41 and 42, which are provided at the center of the reel adaptor hubs 20 and 30, engage the openings provided in the smaller reel $R_2$. The projecting annular ribs 36 and 38 in this case press on the side surfaces of the reel $R_2$ and act as spacers in order that the spacing between the hubs 28 and 30 be the same as when a tape $R_1$ is mounted so that the annular ribs 32 and 34 can rotate and slide in the channels 20 and 22.

A housing lid 44 is pivotally mounted to the rear housing wall 19 by means of pivot rod 46. Mounted within the lid 44 is a guide bar 48 over which the leader tape L passes as it comes off tangentially from the reel $R_1$ or $R_2$, as shown in FIG. 3. The tape L is then made to change planes and passes through a guide bracket 50 and then around and idler wheel 52 which is pivoted to the lid 44 about a vertical axis. The wheel 52 is a solid nylon pinch roller.

Adjacent the wheel 52 and as shown in FIG. 7, there is provided a wheel 56. Wheel 56 is a drive wheel and is connected to a manual knob 60. Wheel 56 is made of a solid rubber, but has a pair of flats 58, as shown in FIG. 7. A guide member 54 is also provided having a projection which approaches the nip formed between wheels 52 and 56. The flats leave a gap at the nip between wheel 52 and wheel 56. The purpose of the flats 58 on wheel 56 is such that the leader tape L need merely be advanced a short distance by rotating the knob 60 when the arcuate segment engages the tape. The tape L can then be grasped by the operator's fingers and pulled from the reel around the wheel 52 past the flat 58 which is then opposite the wheel 52.

The tape L is prevented from unravelling as mentioned before by means of the leaf springs 37 and 39.

The tape advances in the path through the cutter 16. The cutter 16 includes a pair of mounting brackets 64 and 66 which mount a rotating knife holder 68. The knife holder 68 includes a knob 70, and at the other end thereof, rotating in the bracket 64 is a dial wheel 72. The dial wheel 72, rotating in the bracket 64, is separate from the knife holder part 68 but is keyed therewith by means of the slot 71 in the dial 72, in which is provided a spring 73 urging the knife holder 68 away from the dial 72.

Figure 4:
FIG. 4 which is on the same sheet of drawings as FIG. 1, is an end elevation view of the embodiment shown in FIG. 2.

When the knob 70 is rotated, the dial 72 will also rotate because of the keying of the holder 68 in the recess provided in the dial 72. A locking tab 74, as shown in FIGS. 4 and 8, is resiliently mounted on the top of the bracket 64 and includes a projection 78 adapted to pass through an opening in the bracket 64 and engage one of a number of recesses 76 in the dial wheel 72. Thus, the plane of the knife can be rotated by rotating the knob 70, and the knife holder 68 can be locked by means of the locking tab 74, as shown in FIG. 8.

Figure 1:
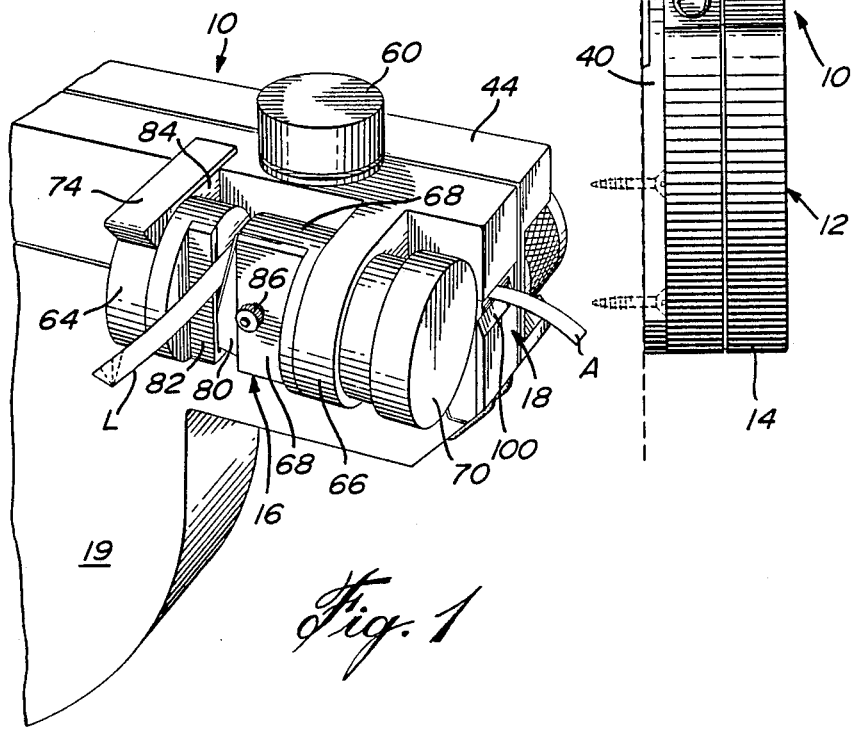
FIG. 1 is a fragmentary perspective view of a detail of the present invention.

The knife per se includes blade 80 held by a mounted screw 86. The knife blade 80 moves with the knife holder 68 into a slot formed in a die 82. The die 82 forms part of the dial member 72. A slot 84 is provided between the die member 82 and the knife holder 68 such as to allow the tape to move therebetween from the feeder area 14 whereby it is cut. The tape L can be cut at different angles, as shown in dotted lines in FIG. 1, depending on the setting of the dial 72.

An adhesive tape dispenser is provided in the end wall of the housing 10, as shown at 28 in FIGS. 3 and 7. A reel 88 containing tape A is mounted on a hub 90 forming part of the housing 10. Adjacent the hub 90 and near the end of the wall is a dispensing idler wheel 92 which is provided with circumferential ribs 94. A drive wheel 96 is located above the dispensing wheel 92 and engages the tape A on the ribs 94 of the wheel 92. The drive wheel 96 is a solid rubber pinch wheel for frictionally engaging the top surface of the adhesive tape A. The adhesive surface of the tape is, of course, in contact with the circumferential ribs 94 on the dispensing wheel 92, and thus the minimum amount of contact between the adhesive surface of the tape and the mechanism is provided. The drive wheel 96 is driven by hand knob 98. When rotated, the tape A passes through a slot over a knife 100, as shown in the drawings.

Briefly, in operation, when it is necessary to remove a piece of leader tape L for purposes of editing, the knob 60 is rotated one half a revolution in a counterclockwise direction which causes the wheel 56, that is, an arcuate segment thereof, to come into contact with the tape L and press it at the nip against the wheel 52. The surfaces of the wheels 56 and 52 engage the tape and advance it through the cutting station 16 a short distance, enough for it to be grasped by one's fingers. The tape L is then pulled against the resistance of the reel $R_1$ or $R_2$ and the leaf springs 37 and 39. The flat 58 is thus opposite the wheel 52 at this position, providing no resistance to the pulling of the tape L. When a sufficient length of tape L has been pulled through the cutting station 16, the knob 70 is grasped. If necessary, the knob 70 can be rotated to thereby rotate the dial 72 with the tab 74 lifted so as to choose the angle at which the tape is to be cut. The tab 74 is then replaced in its proper position, locking the dial 72 and thus the knob 70 against further rotation. The knob 70 is then pressed axially towards the dial 72 such that the knife 80 advances against the slot and the die 82 to cut the tape L.

Likewise, if a piece of adhesive is required to splice the leader tape at the editing table, the knob 98 can be rotated, thereby advancing a piece of tape A which can be cut against the cutting knife 100 when a sufficient length has been advanced.

I claim:

1. An apparatus for feeding a leader tape comprising a housing including means for rotatably mounting a reel of leader tape, guide means in the housing for determining the feed path of the tape in order to change the direction and plane of the path of the tape, means mounted in the housing for selectively engaging the tape and advancing it a predetermined distance in the feed path, and cutting means mounted on the housing for cutting the tape in the feed path downstream of the means for advancing the tape, said guide means including a first guide bar at a position such that the tape can be removed tangent to the reel and second guide means downstream of the guide bar for changing the plane of the tape by approximately 90°, and a third guide means downstream of the second guide means for changing the direction of the tape by approximately 90°.

2. An apparatus as defined in claim 1, wherein the means for rotatably mounting the reel of tape includes a pair of vertical top open channels located on opposite walls in the reel housing and reel adaptor hubs are provided, including a pair of separate hubs, each provided with an annular rim for being supported in a respective channel and for rotating movement therein, the adaptor hubs including an internal annular rib for engaging the reel.

3. An apparatus as defined in claim 1, wherein the means for selectively engaging the tape and advancing it in the feed path includes a first idler wheel and a second driven wheel forming a nip with the first idler wheel, the second driven wheel including a pair of opposed flats such that, when one of the flats is opposite the first wheel at the nip, there is a gap formed at the nip allowing unimpeded movement of the tape therethrough, and knob means being provided for manually rotating the driven wheel to advance the tape a selected distance.

4. An apparatus as defined in claim 1, wherein the cutting means includes cutting brackets on either side of the path of the tape, and a knife holder mounted on one side of the path adapted to move a knife across the path against a die on the other side of the path for cutting the tape.

5. An apparatus as defined in claim 1, wherein said housing includes an adhesive tape dispenser provided thereon, said dispenser including a hub for mounting a reel of adhesive tape and a dispensing wheel including a plurality of circumferential ribs adapted to contact the adhesive surface of the tape and a driven wheel adapted to engage the other side of the tape against the rib wheel so as to advance the adhesive tape, and slot means provided in the housing for allowing the tape to move outwardly thereof and a knife arranged with the slot in order to permit the tape to be cut.

* * * * *